United States Patent
Evans et al.

(10) Patent No.: US 8,673,249 B2
(45) Date of Patent: Mar. 18, 2014

(54) PROCESS OF REMOVING $NO_x$ FROM FLUE GAS

(71) Applicant: Intercat, Inc., Manasquan, NJ (US)

(72) Inventors: Martin Evans, Tolland, CT (US); Xunhua Mo, Savannah, GA (US); Raymond Paul Fletcher, Utrecht (NL)

(73) Assignee: Intercat, Inc., Manasquan, NJ (US)

( * ) Notice: Subject to any disclaimer, the term of this patent is extended or adjusted under 35 U.S.C. 154(b) by 0 days.

(21) Appl. No.: 13/773,975

(22) Filed: Feb. 22, 2013

(65) Prior Publication Data

US 2013/0224095 A1 Aug. 29, 2013

Related U.S. Application Data

(60) Provisional application No. 61/602,331, filed on Feb. 23, 2012.

(51) Int. Cl.
*B01D 53/56* (2006.01)

(52) U.S. Cl.
USPC ............................. 423/239.1; 95/285

(58) Field of Classification Search
USPC ............................. 423/239.1; 95/285
See application file for complete search history.

(56) References Cited

U.S. PATENT DOCUMENTS

| | | | |
|---|---|---|---|
| 4,220,633 A * | 9/1980 | Pirsh .......................... | 423/239.1 |
| 4,434,147 A | 2/1984 | Dimpfl et al. | |
| 4,778,665 A | 10/1988 | Krishnamurthy et al. | |
| 4,866,019 A | 9/1989 | Van Broekhoven | |
| 4,919,905 A * | 4/1990 | Horaguchi et al. ......... | 423/239.1 |
| 4,946,581 A | 8/1990 | Van Broekhoven | |
| 4,952,382 A | 8/1990 | Van Broekhoven | |
| 4,986,897 A | 1/1991 | Chin | |
| 5,300,270 A * | 4/1994 | Krigmont et al. .......... | 423/239.1 |
| 5,413,699 A * | 5/1995 | Chou ........................... | 208/113 |
| 5,750,084 A * | 5/1998 | Tsutsumi et al. ........... | 423/239.1 |
| 5,785,936 A * | 7/1998 | Levendis ...................... | 423/210 |
| 6,028,023 A | 2/2000 | Vierheilig | |
| 6,479,421 B1 | 11/2002 | Vierheilig | |
| 6,929,736 B2 | 8/2005 | Vierheilig | |
| 7,112,313 B2 | 9/2006 | Vierheilig | |

FOREIGN PATENT DOCUMENTS

EP 0385958 A2 9/1990

OTHER PUBLICATIONS

PCT International Search Report dated Jun. 25, 2013 for corresponding PCT International Patent Application No. PCT/US213/027283 filed Feb. 22, 2013.

* cited by examiner

*Primary Examiner* — Timothy Vanoy
(74) *Attorney, Agent, or Firm* — Kevin M. Carroll

(57) ABSTRACT

The invention includes a process for reducing the amount of $NO_x$ discharged to atmosphere from a FCC unit, having a regenerator and a means for collecting and supporting catalyst particles. The process comprises adding a catalyst to the regenerator flue gas prior to entering the collecting means and precipitating the catalyst in the collecting means to form a catalyst bed. Ammonia or ammonia precursor is added to the flue gas prior to and/or within the collecting means. The flue gas $NO_x$ is reacted with the ammonia or ammonia precursor at 200° C. to 800° C. in the presence of the catalyst bed to reduce the $NO_x$ amount, and the flue gas containing a reduced amount of $NO_x$ is discharged to atmosphere. The catalyst is one or more supported transition or lanthanide metal catalysts. The process can also be utilized in any combustion process.

20 Claims, No Drawings

PROCESS OF REMOVING $NO_x$ FROM FLUE GAS

CROSS-REFERENCE TO RELATED APPLICATION

This application claims the priority benefit of U.S. Provisional Patent Application No. 61/602,331 filed on Feb. 23, 2012.

FIELD OF THE INVENTION

The invention relates to a process of reducing the amount of nitrogen oxides discharged to atmosphere from a fluid catalytic cracking unit or any combustion process.

BACKGROUND OF THE INVENTION

The fluid catalytic cracking (FCC) process is a major source of $SO_x$ and $NO_x$ gas emissions in petroleum refining. In the FCC process, heavy hydrocarbon fractions are cracked to produce lighter, valuable products (gasoline, distillate, and $C_2$-$C_4$ olefins and saturated hydrocarbons). The cracking process takes place in the riser section of a FCC unit, where the hydrocarbon fractions are contacted with a FCC catalyst and other additive particles at elevated temperature. As the endothermic cracking reactions occur, coke (containing carbon, sulfur and nitrogen, among other components) is deposited onto the FCC catalyst and any additive particles. These particles are carried from the FCC unit's reactor to the catalyst regenerator, and the coke is burned off to form carbon monoxide, carbon dioxide, and a wide-range of gaseous sulphur and nitrogen species, e.g., $SO_2$, $SO_3$, COS, $H_2S$, $N_2$, NO, $N_2O$, $NO_2$, $NH_3$, and HCN.

The exact composition of these gases in the flue gas depends upon the detailed reaction conditions in the regenerator. For example, under full-burn conditions (excess oxygen used in combustion of coke) the main species are $SO_2$, $SO_3$, $N_2$ and NO. Under partial-burn conditions (sub-stoichiometric oxygen levels) much higher levels of the "reduced" S and N species (COS, $H_2S$, $NH_3$, HCN) may also be present. Most partial-burn FCC units will have a CO-boiler (COB) downstream to convert the CO to $CO_2$ in order to control CO emissions and recover the energy for steam production. Most of the reduced S and N species in the flue gas are converted to more highly oxidized forms in the CO-boiler. So COS and $H_2S$ are converted to $SO_2$ and $SO_3$; and $NH_3$ and HCN are converted to $N_2$, NO, $N_2O$, and $NO_2$. Therefore, in both full-burn and partial-burn operations, the flue gas contaminants are predominantly sulfur oxide gases (e.g., $SO_2$ and $SO_3$ which are often collectively referred to as "$SO_x$" gases) and nitrogen oxide gases (e.g, NO, $N_2O$, $NO_2$ which are often collectively referred to as "$NO_x$" gases). Other species are only present at much lower concentrations. Unless captured or removed, the hydrogen cyanide would be emitted to the atmosphere along with other flue gases.

Various processes have been taught to remove or reduce the amount of these gases discharged to atmosphere from a FCC unit. One method to remove $NO_x$ gases has been to use ammonia as a reductant to reduce the $NO_x$ to from nitrogen. See, for example, U.S. Pat. No. 4,778,665 which teaches the reduction of $NO_x$ with ammonia in the presence of a crystalline zeolite catalyst. U.S. Pat. No. 4,778,665 teaches that at an appropriate point downstream of the ammonia injection, after reduction of the $NO_x$, the particles are recovered by a cyclone separator or by an electrostatic precipitator, and the flue gas then is discharged.

It is desirable to attain still further improvements in the reduction of $NO_x$ gas in the effluent from an FCC unit.

SUMMARY OF THE INVENTION

The invention includes a process for reducing the amount of nitrogen oxides ($NO_x$) discharged to atmosphere from a fluid catalytic cracking (FCC) unit. A $NO_x$-containing flue gas is discharged from the regenerator of the FCC unit and is then passed to a collecting means for collecting and supporting catalyst particles. The process comprises adding a catalyst to the $NO_x$-containing flue gas prior to the collecting means and precipitating the catalyst in the collecting means to form a catalyst bed in the collecting means. Ammonia or an ammonia precursor is added to the flue gas prior to the collecting means and/or added to the flue gas within the collecting means. $NO_x$ in the flue gas is reacted with the ammonia or ammonia precursor at a temperature ranging from 200° C. to 800° C. in the presence of the catalyst bed to reduce the amount of $NO_x$ in the flue gas, and the flue gas containing a reduced amount of $NO_x$ is discharged to atmosphere. The catalyst is one or more supported transition or lanthanide metal catalysts. The process can also be utilized to remove $NO_x$ from any combustion process.

DETAILED DESCRIPTION OF THE INVENTION

The invention includes a process for reducing the amount of nitrogen oxides ($NO_x$) discharged to atmosphere from a fluid catalytic cracking unit. The FCC unit comprises a regenerator and a collecting means for collecting and supporting catalyst particles, wherein a $NO_x$-containing flue gas is discharged from the regenerator and is then passed to the collecting means.

A typical FCC unit comprises a riser/reaction section in which FCC catalyst particles contact and vaporize a hydrocarbon feedstock entering the bottom of the riser of the FCC unit. The vaporized hydrocarbon carries the FCC catalyst up the riser into the reactor section. Cracked hydrocarbon product exits the top of the reactor and FCC catalyst particles are retained in a bed of particles in the lower part of the reactor. During cracking of the hydrocarbon, coke is deposited on the FCC catalyst.

The coked FCC catalyst is then passed to the regenerator of the FCC unit. As used in this application, the term "regenerator" also includes the combination of a regenerator and a CO boiler, particularly when the regenerator itself is run under partial burn conditions. In the regenerator, coke on the FCC catalyst is burned off in a fluidized bed in the presence of oxygen and a fluidization gas which are typically supplied by entering the bottom of the regenerator. The regenerated FCC catalyst is withdrawn from the fluidized bed and returned to the riser for reuse in the cracking process.

Since the coke generally contains some nitrogen compounds, when the coke is burned in the regenerator nitrogen oxides (i.e., NO, $NO_2$, etc., collectively known as $NO_x$) are formed. Unless some means is provided to control the release of the $NO_x$ from the regenerator, they will be exhausted to atmosphere along with the other combustion gases in the flue gas. The flue gas from the regenerator of an FCC unit will typically contain between about 25 to 2000 ppm of nitrogen oxides.

The $NO_x$-containing flue gas (typically also containing some oxygen along with the other combustion gases) exiting the regenerator will typically carry entrained catalyst fines. A collecting means for collecting the catalyst fines (e.g., an electrostatic precipitator) is usually included in a FCC unit in order to collect catalyst fines so that they are not released to the atmosphere.

In the process of the invention, the $NO_x$-containing flue gas is discharged from the regenerator and is then passed to the collecting means. A catalyst is added to the flue gas prior to entering the collecting means. The catalyst is one or more supported transition or lanthanide metal catalysts. Although not critical for the invention, the mean particle size of the catalyst particles useful in the invention are preferably from 1 μm to 200 μm, more preferably from 10 μm to 100 μm.

The supported transition or lanthanide metal catalyst comprises one or more transition or lanthanide metals and one or more supports. The transition metal includes any Group 3-12 transition metal. The transition or lanthanide metal is preferably vanadium, tungsten, iron, platinum, copper, ceria, or mixtures thereof.

The support is preferably an inorganic oxide and most commonly includes the oxides of Groups 2, 3, 4, 5, 13 and 14 elements. Useful inorganic oxide supports preferably have specific surface areas in the range 10 to 700 $m^2/g$, pore volumes in the range 0.1 to 4 mL/g, and pore diameters from about 10 to 1000 Angstroms (1 to 100 nm). The inorganic oxide support is preferably magnesia, alumina, silica, titania, zirconia, ceria, niobia, tantalum oxides, molybdenum oxides, tungsten oxides, or mixed oxides or composite oxides of any two or more thereof, e.g. magnesia-alumina, silica-alumina, or titania-silica.

The support is preferably a hydrotalcite, a clay, or a zeolite. Suitable clays include halloysites, rectorites, hectorites, montmorillinites, synthetic montmorillinites, sepiolites, activated sepiolites, and kaolins. Suitable zeolites may be any natural or a synthetic zeolite, including molecular sieves, and is preferably composed of aluminum, silicon, and/or phosphorus. The zeolites typically have a three-dimensional arrangement of $SiO_4$, $AlO_4$, and/or $PO_4$ that are joined by the sharing of oxygen atoms. The zeolite frameworks are typically anionic, which are counterbalanced by charge compensating cations, typically alkali and alkaline earth elements (e.g., Na, K, Mg, Ca, Sr, and Ba) and also protons. Other metals (e.g., Fe, Ti, and Ga) may be incorporated into the framework of the zeolite to produce a metal-incorporated zeolite, e.g., titanium silicalite. The zeolite is preferably a beta zeolite, a faujasite (such as an X-zeolite or a Y-zeolite, including NaY and USY), an L-zeolite, a ZSM zeolite (e.g., ZSM-5, ZSM-48), an SSZ-zeolite (e.g., SSZ-13, SSZ-41, SSZ-33), a mordenite, a chabazite, an offretite, an erionite, a clinoptilolite, a silicalite, an aluminum phosphate zeolite (including metalloaluminophosphates such as SAPO-34), a mesoporous zeolite (e.g., MCM-41, MCM-49, SBA-15), a metal-incorporated zeolite, or mixtures thereof; more preferably, the zeolites are beta zeolite, ZSM-5 zeolite, or SSZ-33, or Y-zeolite. The zeolite is most preferably beta zeolite or ZSM-5 zeolite.

The hydrotalcite may be a hydrotalcite or hydrotalcite-like material (HTL). The hydrotalcite or HTL may be collapsed, dehydrated and or dehydroxylated. Non-limiting examples and methods for making various types of HTL are described in U.S. Pat. No. 6,028,023; U.S. Pat. No. 6,479,421; U.S. Pat. No. 6,929,736; and U.S. Pat. No. 7,112,313; which are incorporated by reference herein in their entirety. Other non-limiting examples and methods for making various types of HTL are described in U.S. Pat. No. 4,866,019; U.S. Pat. No. 4,964,581; and U.S. Pat. No. 4,952,382; which are incorporated by reference herein in their entirety. Preferably, the hydrotalcite is a magnesia-alumina hydrotalcite.

Alumina is also a preferred support. The alumina is a solid material that contains a major proportion of aluminum oxide. Amorphous (i.e., non-crystalline) aluminum oxides are particularly preferred for use. In general, suitable aluminas are further characterized by having a relatively large surface area in relation to their mass, preferably the average specific surface area is from 1 $m^2/g$ to 1000 $m^2/g$, and most preferably from about 50 $m^2/g$ to 500 $m^2/g$. "Specific surface area" is used normally in the art and expresses the relationship of surface area to mass. Preferred aluminas include α-alumina, γ-alumina, and activated aluminas. Activated aluminas are partially hydroxylated aluminum oxide whose chemical compositions can be represented by the formula $Al_2O_{(3-x)}(OH)_{2x}$, where x ranges from about 0 to 0.8. Activated aluminas are particularly preferred.

Preferably, the amount of transition or lanthanide metal present in the supported transition or lanthanide metal catalyst will be in the range of from 0.01 to 30 weight percent. When the transition metal is a noble metal such as palladium, platinum, gold, silver, iridium, rhenium, ruthenium, and osmium, the amount of transition metal is more preferably from 0.01 to 10 weight percent, most preferably 0.02 to 5 weight percent. For lanthanide metals and transition metals other than the noble metals, the amount of transition metal present in the supported transition or lanthanide metal catalyst is more preferably 2.5 to 25 weight percent. The manner in which the transition or lanthanide metal is incorporated onto the support is not considered to be particularly critical. For example, a transition or lanthanide metal compound (e.g., copper nitrate) may be supported on a hydrotalcite by impregnation, adsorption, incipient wetness, ion-exchange, precipitation, or the like.

Preferred supported transition or lanthanide metal catalysts include a supported platinum catalyst. The supported platinum catalyst preferably comprises platinum and an inorganic oxide; and more preferably comprises platinum on alumina. Preferred supported transition or lanthanide metal catalysts also comprise (a) vanadium, tungsten, copper, iron, cerium, or mixtures thereof, and (b) a hydrotalcite, a clay, or a zeolite; and more preferably comprises copper and a hydrotalcite. Because the flue gas may contain sulfur oxides, it may be preferable to use catalysts that are also capable of removing $SO_x$ in the flue gas or that are resistant to sulfur poisoning.

After the addition of the catalyst to the $NO_x$-containing flue gas, the catalyst is then collected in the collecting means to form a catalyst bed in the collecting means. Suitable collecting means include an electrostatic precipitator, a filter, a pebble bed, a third stage separator, and the like. Suitable filters include a bag filter and a sintered metal filter. Preferred collecting means include an electrostatic precipitator, a bag filter and a sintered metal filter. In the case of an electrostatic precipitator (ESP), the catalyst collects on plates contained in the ESP and forms a catalyst bed within the ESP. The plates also serve as a support for the catalyst to aid in contacting the $NO_x$-containing flue gas with the catalyst.

Another preferred collecting means includes a combination of a fast fluidized bed and a cyclone. The fast fluidized bed may be a wide point in the flue gas exit line that will contain a dilute number of catalyst particles that act as the fluidized bed. The fast fluidized bed allows particles entrained in the flue gas stream exiting the FCC regenerator to pass through the vessel without increasing pressure drop. The cyclone acts to prevent catalyst from exiting the FCC unit and being emitted to atmosphere, while allowing fines to exit the process. The catalyst particles trapped by the cyclone can be added back into the fast fluidized bed.

Preferably, an additional contact unit is added prior to or after the collecting means in order to ensure good contact between the additive and flue gas.

Ammonia or an ammonia precursor is added to the flue gas. Suitable ammonia precursors include urea, ammonium carbonate, ammonium carbamate, ammonium hydrogen carbonate, and ammonium formate. The ammonia or ammonia precursor can be introduced to the flue gas prior to entering the collecting means and/or within the collecting means. Preferably, the ammonia or ammonia precursor is introduced into the flue gas at a point prior to the collecting means to allow good mixing of the ammonia or ammonia precursor in the flue gas to occur. Preferably, the ammonia and the catalyst are added at the same location to the flue gas.

The amount of ammonia or ammonia precursor present in the flue gas is not considered critical, but preferably the molar ratio of ammonia to $NO_x$ ($NO+NO_2$) is in the range of 0.05 to 1.5, more preferably 0.6 to 1, so that preferably 5 to 100 percent and more preferably at least 60 percent, reduction of $NO_x$ can be achieved.

Although the presence of oxygen is believed to be necessary for the reduction of nitrogen oxides in accordance with the invention, sufficient free oxygen generally remains mixed with the combustion gases leaving the regenerator for the process to occur. Additional oxygen can be added if insufficient oxygen is present, as for example where the regenerator is operated in an oxygen lean mode.

The $NO_x$ in the flue gas is reacted with the ammonia or ammonia precursor in the presence of the catalyst bed in the collecting means to reduce the amount of $NO_x$ in the flue gas. Preferably, the reaction occurs at a temperature ranging from 200° C. to 800° C., more preferably from 200° C. to 500° C. The ammonia reduction of $NO_x$ results in the production of $N_2$. Thus, a flue gas having a reduced amount of $NO_x$ is produced and it is then discharged to atmosphere.

It may be preferable to cool the flue gas prior to the collecting means. Any suitable cooling means may be utilized, including heat exchangers. The addition of the ammonia or ammonia precursor, along with possible diluent gases, may cool the flue gas prior to the collecting means. Preferably, the gases are cooled prior to the point of introducing the ammonia or ammonia precursor to minimize spontaneous combustion of the ammonia or ammonia precursor.

The process of the invention may also be used to reduce $NO_x$ emissions from any combustion process that produces $NO_x$. Thus, the invention also includes a process for reducing the amount of nitrogen oxides discharged to atmosphere from a combustion process. The combustion process comprises a combustion unit and a collecting means for collecting and supporting catalyst particles. The flue gas containing $NO_x$ that is discharged from the combustion unit is passed to the collecting means. The process comprises adding a catalyst to the flue gas prior to entering the collecting means, and then precipitating the catalyst in the collecting means to form a catalyst bed in the collecting means. Ammonia or an ammonia precursor is added to the flue gas prior to entering the collecting means, to the flue gas within the collecting means, or both. The $NO_x$ in the flue gas is reacted with the ammonia or ammonia precursor at a temperature ranging from 200° C. to 800° C. in the presence of the catalyst bed to reduce the amount of $NO_x$ in the flue gas, and the flue gas containing a reduced amount of $NO_x$ is discharged to atmosphere.

All of these process steps are the same as described above. The catalyst is one or more supported transition or lanthanide metal catalysts, as described above. The combustion unit is preferably a coal combustion unit, a fuel oil combustion unit, a wood product combustion unit, a fluid catalytic cracking unit, a fired heater, an ethylene heater, a hydrogen heater, or the like.

The following examples merely illustrate the invention. Those skilled in the art will recognize many variations that are within the spirit of the invention and scope of the claims.

EXAMPLE 1

Preparation of Catalysts

Catalyst 1A: CuO on Hydrotalcite-Like Material

Transition or lanthanide metals can be added to hydrotalcite-like materials as follows: A copper nitrate solution (1082 g, containing 16.76 wt. % solid) is added to a slurry of a MgO and $Al_2O_3$ mixture (6771 g, Mg/Al molar ratio 3/1). The mixture is stirred for 1 hour at room temperature, and the resulting mixture is then spray dried and calcined at 500° C. Catalyst 1A contains approximately 26 wt. % $Al_2O_3$, 55 wt. % MgO, and 19 wt. % CuO.

Catalyst 1 B: $Pt/Al_2O_3$

Pt is added to $Al_2O_3$ as follows: An aqueous $Pt(NH_3)_2Cl_2$ solution (containing 0.137 g $Pt(NH_3)_2Cl_2$ (containing 54.8 wt. % solid) in 19.8 g $H_2O$) is sprayed onto $Al_2O_3$ (116 g). The resulting material is then dried at 120° C. and calcined at 500° C. Catalyst 1B contains approximately 0.06 wt. % Pt.

Catalyst 1C: $Fe_2O_3$ and $CeO_2$ on Hydrotalcite-Like Material

Catalyst 1C can be prepared according to the procedure of Catalyst 1A except that iron nitrate and cerium nitrate are used in place of the copper nitrate solution. Catalyst 1A contains approximately 21 wt. % $Al_2O_3$, 53 wt. % MgO, 10 wt.% $Fe_2O_3$, and 16 wt. % $CeO_2$.

Catalyst 1 D: $Pd/Al_2O_3$

Catalyst 1D is prepared according to the procedure of Catalyst 1B except that $Pd(NH_3)_2Cl_2$ is used in place of the $Pd(NH_3)_2Cl_2$ solution. Catalyst 1D contains approximately 0.06 wt. % Pt.

Catalyst 1 E: $V_2O_5/TiO_2$

Catalyst 1 E is a commercial selective catalytic reduction catalyst containing approximately 85 wt. % $TiO_2$, 2.5 wt. % $V_2O_5$, and 9 wt. % $SiO_2$.

The physical properties of the catalysts are listed in Table 1.

EXAMPLE 2

No Reduction Tests

Except for Catalyst 1 E, all the samples were calcined at 732° C. for one hour before testing. The catalysts of Example 1 are tested in a fix bed quartz reactor. A gas mixture (260 cc/min) containing 2307 ppm $NH_3$ and 769 ppm NO is contacted with a fixed bed of 1.0 g catalyst in the presence of 3 vol. % oxygen and the balance helium. The effluent gas was analyzed on-line by a mass spectrometer and/or IR analyzer, and the temperature of the catalyst bed was monitored by an Omega temperature logger. The percent reduction of NO at three temperatures is shown in Table 2. The results show that although a palladium/alumina and a vanadia/titania catalyst are effective at removing some $NO_x$, a copper-containing hydrotalcite, an iron-cerium-containing hydrotalcite and platinum/alumina are more effective catalysts for the removal of $NO_x$.

TABLE 1

Physical properties of catalysts

| Catalyst | Average Particle Size ($\mu$m) | Surface Area ($m^2/g$) |
|---|---|---|
| 1A | 50 | 118 |
| 1B | 72 | 91 |
| 1C | 68 | 127 |
| 1D | 71 | 105 |
| 1E | — | — |

TABLE 2

Testing Results

| | NO Conversion (%) | | |
|---|---|---|---|
| Catalyst | 250° C. | 300° C. | 350° C. |
| 1A | — | — | 80 |
| 1B | 90 | 100 | — |
| 95% 1A + 5% 1B | 50 | 100 | — |
| 99% 1A + 1% 1B | 10 | 100 | — |
| 95% 1C + 5% 1B | 50 | 100 | — |
| 1D | — | — | 10 |
| 1E | — | 10 | 40 |

We claim:

1. A process for reducing the amount of nitrogen oxides ($NO_x$) discharged to atmosphere from a fluid catalytic cracking unit comprising a regenerator and a collecting means for collecting and supporting catalyst particles, wherein a flue gas containing $NO_x$ is discharged from the regenerator and is then passed to the collecting means, said process comprising:
    (a) adding a catalyst to the flue gas prior to entering the collecting means;
    (b) precipitating the catalyst in the collecting means to form a catalyst bed in the collecting means;
    (c) adding ammonia or an ammonia precursor to the flue gas prior to entering the collecting means, to the flue gas within the collecting means, or both;
    (d) reacting $NO_x$ in the flue gas with the ammonia or ammonia precursor at a temperature ranging from 200° C. to 800° C. in the presence of the catalyst bed to reduce the amount of $NO_x$ in the flue gas; and
    (e) discharging the flue gas containing a reduced amount of $NO_x$ to atmosphere,
    wherein the catalyst is one or more supported transition or lanthanide metal catalysts and the collecting means is an electrostatic recipitator or a combination of a fast fluidized bed and a cyclone.

2. The process of claim 1 wherein the flue gas is cooled prior to entering the collecting means.

3. The process of claim 1 wherein the supported transition or lanthanide metal catalyst is a supported platinum catalyst.

4. The process of claim 3 wherein the supported platinum catalyst comprises platinum and an inorganic oxide.

5. The process of claim 4 wherein the supported platinum catalyst comprises platinum on alumina.

6. The process of claim 1 wherein the supported transition or lanthanide metal catalyst comprises (a) vanadium, tungsten, copper, iron, cerium, or mixtures thereof, and (b) a hydrotalcite, a clay, or a zeolite.

7. The process of claim 6 wherein the supported transition or lanthanide metal catalyst comprises copper and a hydrotalcite.

8. The process of claim 1 wherein $NO_x$ in the flue gas is reacted with the ammonia at a temperature ranging from 200° C. to 500° C.

9. The process of claim 1 wherein the catalyst has a mean particle size of 10 $\mu$m to 100 $\mu$m.

10. A process for reducing the amount of nitrogen oxides ($NO_x$) discharged to atmosphere from a fluid catalytic cracking unit comprising a regenerator and a collecting means for collecting and supporting catalyst particles, wherein a flue gas containing $NO_x$ is discharged from the regenerator and is then passed to the collecting means, said process comprising:
    (a) adding a catalyst to the flue gas prior to entering the collecting means;
    (b) precipitating the catalyst in the collecting means to form a catalyst bed in the collecting means;
    (c) adding ammonia or an ammonia precursor to the flue gas prior to entering the collecting means, to the flue gas within the collecting means, or both;
    (d) reacting $NO_x$ in the flue gas with the ammonia or ammonia precursor at a temperature ranging from 200° C. to 800° C. in the presence of the catalyst bed to reduce the amount of $NO_x$ in the flue gas; and
    (e) discharging the flue gas containing a reduced amount of $NO_x$ to atmosphere,
    wherein the catalyst comprises copper and a hydrotalcite or the catalyst is a supported platinum catalyst.

11. The process of claim 10 wherein the flue gas is cooled prior to entering the collecting means.

12. The process of claim 10 wherein the collecting means is an electrostatic precipitator, a bag filter, a sintered metal filter, or a combination of a fast fluidized bed and a cyclone.

13. The process of claim 10 wherein the supported platinum catalyst comprises platinum and an inorganic oxide.

14. The process of claim 13 wherein the supported platinum catalyst comprises platinum on alumina.

15. The process of claim 10 wherein $NO_x$ in the flue gas is reacted with the ammonia at a temperature ranging from 200° C. to 500° C.

16. The process of claim 10 wherein the catalyst has a mean particle size of 10 $\mu$m to 100 $\mu$m.

17. A process for reducing the amount of nitrogen oxides ($NO_x$) discharged to atmosphere from a fluid catalytic cracking unit comprising a regenerator and a collecting means for collecting and supporting catalyst particles, wherein a flue gas containing $NO_x$ is discharged from the regenerator and is then passed to the collecting means, said process comprising:
    (a) adding a catalyst to the flue gas prior to entering the collecting means;
    (b) precipitating the catalyst in the collecting means to form a catalyst bed in the collecting means;
    (c) adding ammonia or an ammonia precursor to the flue gas prior to entering the collecting means, to the flue gas within the collecting means, or both;
    (d) reacting $NO_x$ in the flue gas with the ammonia or ammonia precursor at a temperature ranging from 200° C. to 800° C. in the presence of the catalyst bed to reduce the amount of $NO_x$ in the flue gas; and
    (e) discharging the flue gas containing a reduced amount of $NO_x$ to atmosphere,
    wherein the catalyst is one or more supported transition or lanthanide metal catalysts and the flue gas is cooled prior to entering the collecting means.

18. The process of claim 17 wherein the collecting means is an electrostatic precipitator, a bag filter, a sintered metal filter, or a combination of a fast fluidized bed and a cyclone.

19. The process of claim 17 wherein the supported transition or lanthanide metal catalyst comprises (a) vanadium, tungsten, copper, iron, cerium, or mixtures thereof, and (b) a hydrotalcite, a clay, or a zeolite.

20. The process of claim 17 wherein the catalyst has a mean particle size of 10 μm to 100 μm.

* * * * *